United States Patent
Kim et al.

(10) Patent No.: US 9,041,621 B2
(45) Date of Patent: May 26, 2015

(54) APPARATUS AND METHOD FOR IMPLEMENTING HAPTIC-BASED NETWORKED VIRTUAL ENVIRONMENT WHICH SUPPORTS HIGH-RESOLUTION TILED DISPLAY

(75) Inventors: Jong Won Kim, Gwangju (KR); Seok Hee Lee, Gwagju (KR); Seok Ho Son, Gwangju (KR)

(73) Assignee: GWANGJU INSTITUTE OF SCIENCE AND TECHNOLOGY, Buk-Gu, Gwangju (KR)

( * ) Notice: Subject to any disclaimer, the term of this patent is extended or adjusted under 35 U.S.C. 154(b) by 225 days.

(21) Appl. No.: 13/696,715

(22) PCT Filed: Dec. 15, 2010

(86) PCT No.: PCT/KR2010/008957
§ 371 (c)(1),
(2), (4) Date: Nov. 7, 2012

(87) PCT Pub. No.: WO2011/139012
PCT Pub. Date: Nov. 10, 2011

(65) Prior Publication Data
US 2013/0050062 A1    Feb. 28, 2013

(30) Foreign Application Priority Data

May 7, 2010    (KR) ........................ 10-2010-0043112

(51) Int. Cl.
*G09G 3/00*    (2006.01)
*G06T 15/08*    (2011.01)
(Continued)

(52) U.S. Cl.
CPC .............. *G06F 3/1446* (2013.01); *G06F 3/016* (2013.01); *G06T 17/00* (2013.01); *G06T 2210/21* (2013.01)

(58) Field of Classification Search
CPC ......... G06T 15/08; G06T 15/20; G06T 17/00; G06T 2210/21; G06F 3/1431; G06F 3/1446; G06F 3/016; G09G 2300/026; G02F 1/13336
USPC ............. 345/418, 1.1, 1.2, 1.3, 419, 424, 582
See application file for complete search history.

(56) References Cited

U.S. PATENT DOCUMENTS 5,687,737 A * 11/1997 Branham et al. ............... 600/523
5,850,352 A * 12/1998 Moezzi et al. ................. 345/419
(Continued)

OTHER PUBLICATIONS

Swarup, N., "Haptic Interaction with Deformable Objects Using Real-Time Dynamic Simulation", Massachusetts Institute of Technology, Sep. 1995, pp. 1-83.*
(Continued)

*Primary Examiner* — Julie Anne Watko
(74) *Attorney, Agent, or Firm* — Nath, Goldberg & Meyer; Joshua B. Goldberg (57) ABSTRACT

An apparatus and method of implementing haptic-based networked virtual environments supporting high-resolution tiled displays. A haptic rendering process of detecting collision between a user of a haptic-device over a virtual environment and each of at least one virtual object and providing a physical force corresponding to a detection result to the haptic-device is performed, and a graphic rendering process of converting each virtual object represented as 3-D data into an object stream represented as 2-D data such that each virtual object is displayed as a 2-D image, and assigning a priority and a frame rate to each converted object stream according to a preset assignment criterion is performed. A plurality of displays provide a display image, including object streams of the virtual objects and background pixels, so that a virtual environment allowing the user of the haptic-device to visually and tactilely immerse thereto is effectively realized by utilizing limited resources.

20 Claims, 6 Drawing Sheets

| Priority | Contact | Object |
|---|---|---|
| 1 | Yes or No | HIP |
| 1 | Yes | Contact object with HIP |
| 2 | Yes | The nearest object from HIP |
| N − 1 | No | $N^{th}$ object from HIP |

(51) Int. Cl.
*G06F 3/14* (2006.01)
*G06F 3/01* (2006.01)
*G06T 17/00* (2006.01)

(56) References Cited

U.S. PATENT DOCUMENTS

| | | | |
|---|---|---|---|
| 6,084,587 A * | 7/2000 | Tarr et al. | 345/419 |
| 6,310,650 B1 * | 10/2001 | Johnson et al. | 348/383 |
| 7,215,637 B1 * | 5/2007 | Ferguson et al. | 370/230.1 |
| 7,386,429 B1 * | 6/2008 | Fujisaki | 703/6 |
| 7,420,539 B2 * | 9/2008 | Ryu et al. | 345/156 |
| 8,264,493 B2 * | 9/2012 | Peterfreund | 345/522 |
| 2006/0109266 A1 * | 5/2006 | Itkowitz et al. | 345/419 |
| 2006/0242871 A1 * | 11/2006 | Kondo et al. | 40/446 |
| 2006/0284834 A1 * | 12/2006 | Itkowitz et al. | 345/156 |
| 2008/0046226 A1 * | 2/2008 | Massie et al. | 703/18 |
| 2008/0088620 A1 * | 4/2008 | Shih et al. | 345/420 |
| 2009/0195538 A1 * | 8/2009 | Ryu et al. | 345/419 |
| 2011/0109624 A1 * | 5/2011 | Greenberg et al. | 345/419 |

OTHER PUBLICATIONS

Andrews S, Mora J, Lang J, Lee W (2006) Hapticast: a physically-based 3D game with haptic feedback. In: Futureplay'06.*

Cruz-Neira, Carolina et al., "Surround-Screen Projection-Based Virtual Reality: The Design and Implementation of the CAVE," SIGGRAPH 93, Computer Graphics Proceedings, Annual Conference Series, (1993), pp. 135-142.*

Czernuszenko, Marek et al., "The ImmersaDesk and Infinity Wall Projection-Based Virtual Reality Displays," Computer Graphics, May 1997, pp. 46-49.*

* cited by examiner

| Priority | Contact | Object |
|---|---|---|
| 1 | Yes or No | HIP |
| 1 | Yes | Contact object with HIP |
| 2 | Yes | The nearest object from HIP |
| N − 1 | No | $N^{th}$ object from HIP |

APPARATUS AND METHOD FOR IMPLEMENTING HAPTIC-BASED NETWORKED VIRTUAL ENVIRONMENT WHICH SUPPORTS HIGH-RESOLUTION TILED DISPLAY

This is a National Phase Application filed under 35 U.S.C. 371 as a national stage of PCT/KR2010/008957, filed Dec. 15, 2010, and claims priority from Korean Application No. 10-2010-0043112, filed May 7, 2010, the content of each of which is hereby incorporated by reference in its entirety.

TECHNICAL FIELD

The present invention relates to a haptic technology. More particularly, the present invention relates to the implementation of haptic-based networked virtual environments.

BACKGROUND ART

As technologies such as computing power, network capacity, and a user-immersible display are developed, modern people may make contact with next-generation applications such as network virtual environments (NVE) at their home or their workplaces. The NVE refers to an environment in which a plurality of users make communication with each other in real time even though the users are scattered all over the world. The NVE is implemented by combining 3-D realistic graphic data with stereo sound data, and is an environment into which the users can be immersed.

Meanwhile, a haptic technology has been specially spotlighted in a human-computer interaction field. According to the haptic technology, physical force is applied to a user through feedback, so that the user can be more immersed into the virtual environment.

Since the haptic-based networked virtual environments, which are implemented by combining the haptic technology with the network virtual environment, more induce the immersion of the user into the virtual environment as compared with a typical network virtual environment, the haptic-based networked virtual environments have been more spotlighted recently.

However, schemes of implementing the haptic-based networked virtual environments do not suggest a scheme of effectively implementing a haptic-based networked virtual environment supporting a high-resolution tiled display and a scheme of effectively using resources (limited resources) used for implementing the virtual environment.

The details thereof will be described below.

Recently, the inventions related to a tiled display system capable of providing a display combination required by a user by integrating various displays have been actually developed. However, the studies and researches on the reproduction of a haptic-based networked virtual environment system onto the high-resolution tiled display are insufficient. Meanwhile, in order to stably provide touch information to a user, a haptic-rendering process having an update rate of 1 kHz or more is required. Further, in order to allow a user to visually immerse into a virtual environment, a plurality of graphic rendering processes to synchronize a plurality of displays constituting a high-resolution tiled display with each other and to provide a desirable frame rate of 30 fps are required. However, since the hardware performance of the system is restricted, there is a limitation in stably performing two processors. Further, schemes of implementing the current haptic-based networked virtual environments do not suggest a scheme to overcome the above limitation.

DISCLOSURE

Technical Problem

Accordingly, the present invention has been made keeping in mind the above problems occurring in the prior art, and an object of at least one embodiment of the present invention is to provide an apparatus for implementing a haptic-based networked virtual environment, capable of effectively implementing a haptic-based networked virtual environment supporting a high-resolution tiled display by effectively using limited resources.

Another object of at least one embodiment of the present invention is to provide a method of implementing a haptic-based networked virtual environment, capable of effectively implementing a haptic-based networked virtual environment supporting a high-resolution tiled display by effectively using limited resources.

Still another object of at least one embodiment of the present invention is to provide a computer-readable recording medium storing a computer program for executing a method of implementing a haptic-based networked virtual environment, which can effectively implement a haptic-based networked virtual environment supporting a high-resolution tiled display by effectively using limited resources, in a computer.

Technical Solution

In order to accomplish the objects, according to one aspect of the present invention, there is provided an apparatus for implementing a haptic-based networked virtual environment supporting a high-resolution tiled display. The apparatus includes a haptic rendering module detecting collision between a user of a haptic device over a virtual environment and each of at least one virtual object and providing a physical force corresponding to a detection result to the haptic device, a graphic rendering module converting each virtual object represented as 3-D data into an object stream represented as 2-D data such that each virtual object is displayed as a 2-D image, and assigning apriority and a frame rate to each converted object stream according to a preset assignment criterion, and a tiled display module including a plurality of displays, and receiving each object stream according to the priority and the frame rate corresponding to the object stream, each display displaying a portion of a display image, which includes the object streams of the virtual objects and background pixels, corresponding to the display.

In this case, the graphic rendering module includes a projecting module converting a 3-D image including the virtual objects into the display image which is a 2-D image including the object streams, and a pixel distribution module assigning a portion of the display image to each display such that the displays integrally display the display image, and providing the portion of the display image corresponding to each display to the display.

In this case, the pixel distribution module includes an object-based segmentation module tracking each object stream and assigning the priority corresponding to user preference information to the object stream, and a frame rate control module assigning the frame rate to the object stream by taking a present haptic sampling time into consideration.

In addition, the frame rate control module compares the present haptic sampling time with a maximum allowable sampling time or a minimum allowable sampling time and operates according to a comparison result.

In this case, the frame rate control module decreases a numerical value of the frame rate by a predetermined value if the present haptic sampling time exceeds a maximum allowable sampling time, and increases the numerical value of the frame rate by a predetermined numerical value if the present haptic sampling time is less than a minimum allowable sampling time.

In addition, the apparatus for implementing the haptic-based networked virtual environment supporting the high-resolution tiled display further includes a display cluster creating the display image by combining the object streams with the background pixels.

In this case, at least one apparatus for implementing a haptic-based networked virtual environment supporting the high-resolution tiled display are connected to a server, and wherein position information of each virtual object is information provided from the server to each apparatus for implementing the haptic-based networked virtual environment supporting the high-resolution tiled display.

According to another aspect of at least one embodiment of the present invention, there is provided a method of implementing a haptic-based networked virtual environment supporting a high-resolution tiled display. The method includes (a) detecting collision between a user of a haptic device over a virtual environment and each of at least one virtual object and providing a physical force corresponding to a detection result to the haptic device, (b) converting each virtual object represented as 3-D data into an object stream represented as 2-D data such that each virtual object is displayed as a 2-D image, and assigning a priority and a frame rate to each converted object stream according to a preset assignment criterion, and (c) receiving each object stream according to the priority and the frame rate corresponding to the object stream, each of a plurality of displays displaying a portion of a display image, which includes the object streams of the virtual objects and background pixels, corresponding to the display.

In this case, step (b) includes (b1) converting a 3-D image including the virtual objects into the display image which is a 2-D image including the object streams, and (b2) assigning a portion of the display image to each display such that the displays integrally display the display image, and providing the portion of the display image corresponding to each display to the display.

In this case, step (b2) includes (b21) tracking each object stream and assigning the priority corresponding to user preference information to the object stream, and (b22) assigning the frame rate to the object stream by taking a present haptic sampling time into consideration.

In this case, step (b22) is operated according to a comparison result after comparing the present haptic sampling time with a maximum allowable sampling time or a minimum allowable sampling time.

In this case, in step (b22), a numerical value of the frame rate is decreased by a predetermined value if the present haptic sampling time exceeds a maximum allowable sampling time, and the numerical value of the frame rate is increased by a predetermined numerical value if the present haptic sampling time is less than a minimum allowable sampling time.

In addition, the method further includes creating the display image by combining the object streams with the background pixels. In step (c), the created display image is displayed.

In this case, position information of each virtual object is information provided from a server to an apparatus performing the method of implementing the haptic-based networked virtual environment supporting the high-resolution tiled display.

According to still another aspect of at least one embodiment of the present invention, there is provided a computer-readable recording medium storing a computer program for executing, in a computer, a method of implementing a haptic-based networked virtual environment supporting a high-resolution tiled display, which includes detecting collision between a user of a haptic device over a virtual environment and each of at least one virtual object and providing a physical force corresponding to a detection result to the haptic device, converting each virtual object represented as 3-D data into an object stream represented as 2-D data such that each virtual object is displayed as a 2-D image, and assigning a priority and a frame rate to each converted object stream according to a preset assignment criterion, and receiving each object stream according to the priority and the frame rate corresponding to the object stream, each of a plurality of displays displaying a portion of a display image, which includes the object streams of the virtual objects and background pixels, corresponding to the display.

Advantageous Effects

As described above, according to at least one embodiment of the present invention, limited resources can be effectively used, so that the haptic-based networked virtual environment supporting the high-resolution tiled display can be effectively implemented. Accordingly, the efficiency can be improved in terms of cost when constructing the haptic-based networked virtual environment supporting the high-resolution tiled display.

BEST MODEL

In order to accomplish the objects, according to at least one embodiment of the present invention, there is provided an apparatus for implementing a haptic-based networked virtual environment supporting a high-resolution tiled display. The apparatus includes a haptic rendering module detecting collision between a user of a haptic device over a virtual environment and each of at least one virtual object and providing a physical force corresponding to a detection result to the haptic device, a graphic rendering module converting each virtual object represented as 3-D data into an object stream represented as 2-D data such that each virtual object is displayed as a 2-D image, and assigning a priority and a frame rate to each converted object stream according to a preset assignment criterion, and a tiled display module including a plurality of displays, and receiving each object stream according to the priority and the frame rate corresponding to the object stream, each display displaying a portion of a display image, which includes the object streams of the virtual objects and background pixels, corresponding to the display.

According to at least one embodiment of the present invention, there is provided a method of implementing a haptic-based networked virtual environment supporting a high-resolution tiled display. The method includes (a) detecting collision between a user of a haptic device over a virtual environment and each of at least one virtual object and providing a physical force corresponding to a detection result to the haptic device, (b) converting each virtual object represented as 3-D data into an object stream represented as 2-D data such that each virtual object is displayed as a 2-D image, and assigning a priority and a frame rate to each converted object stream according to a preset assignment criterion, and (c) receiving each object stream according to the priority and the frame rate corresponding to the object stream, each of a plurality of displays displaying a portion of a display image, which includes the object streams of the virtual objects and background pixels, corresponding to the display.

According to at least one embodiment of the present invention, there is provided a computer-readable recording medium storing a computer program for executing, in a computer, a method of implementing a haptic-based networked virtual environment supporting a high-resolution tiled display, which includes detecting collision between a user of a haptic device over a virtual environment and each of at least one virtual object and providing a physical force corresponding to a detection result to the haptic device, converting each virtual object represented as 3-D data into an object stream represented as 2-D data such that each virtual object is displayed as a 2-D image, and assigning a priority and a frame rate to each converted object stream according to a preset assignment criterion, and receiving each object stream according to the priority and the frame rate corresponding to the object stream, each of a plurality of displays displaying a portion of a display image, which includes the object streams of the virtual objects and background pixels, corresponding to the display.

MODE FOR INVENTION

The above and other objects and other advantages of the present invention will be more clearly understood from the following detailed description when taken in conjunction with the accompanying drawings.

Hereinafter, an apparatus and a method of implementing a haptic-based networked virtual environment supporting a high-resolution tiled display will be described with reference to accompanying drawings.

Figure 1:
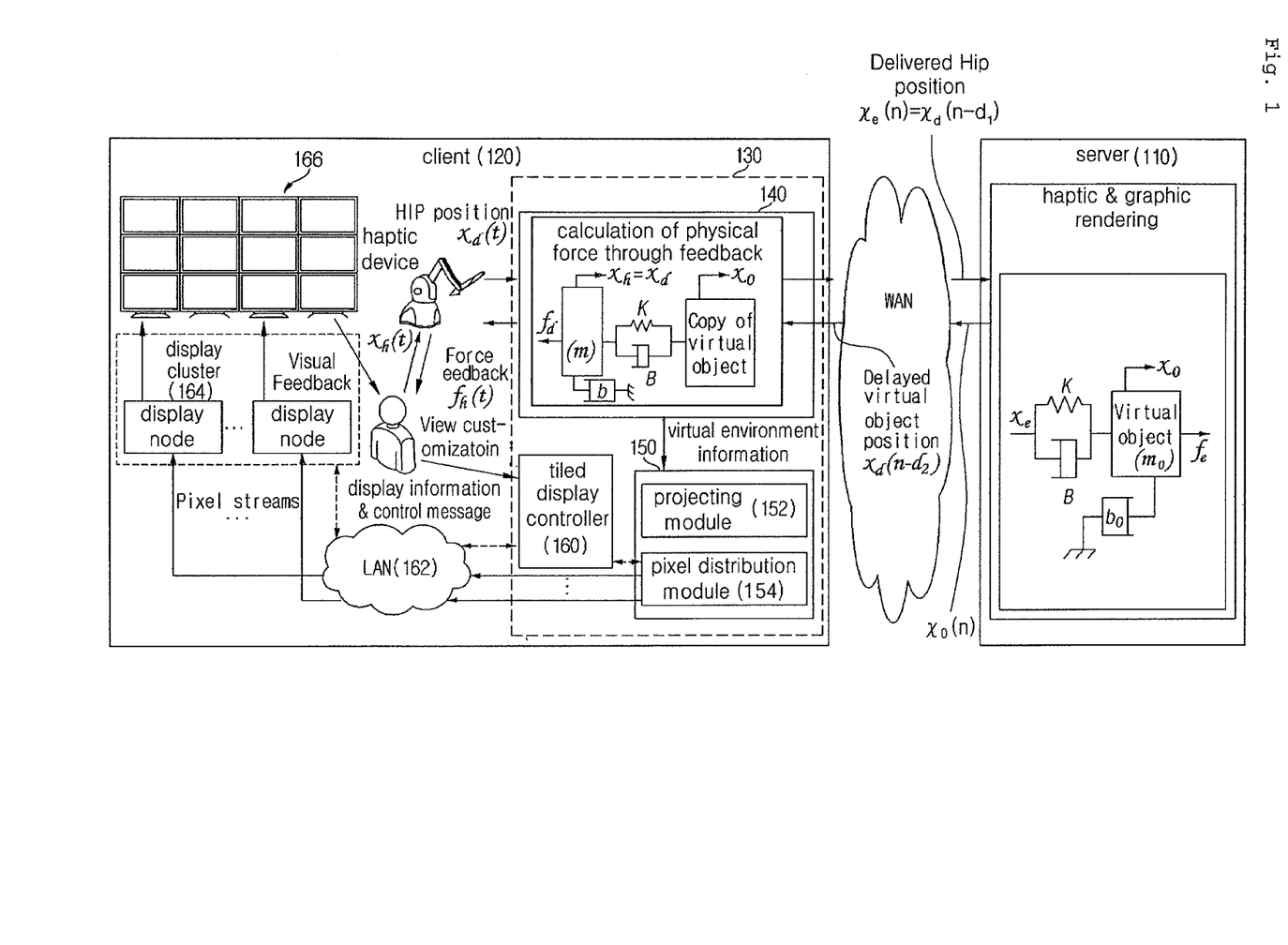
FIG. 1 is a view showing an apparatus for implementing a haptic-based networked virtual environment according to at least one embodiment of the present invention.

FIG. 1 is a view showing an apparatus for implementing a haptic-based networked virtual environment according to at least one embodiment of the present invention.

As shown in FIG. 1, a client 120 is connected to a server 110 over a network. Although only one client 120 is connected to the server as shown in FIG. 1, this is briefly shown for the illustrative purpose. Actually, a plurality of clients 120 may be connected to the server 110. In this case, the network may be a wide area network (WAN). The following description is made on the assumption that one client 120 is connected to the server 110 as shown in FIG. 1, a haptic device is provided at the side of the client 120, a user of the haptic device feels or operates the virtual environment by manipulating the haptic device, and several virtual objects exist on the virtual environment. For example, the user of the haptic device is playing a car racing game together with other users on the virtual environment.

If the user of the haptic device operates (moves) the haptic device, a haptic interaction point (HIP) of the haptic device moves along the movement of the haptic device. The HIP refers to a virtual point obtained by projecting a predetermined tip point of the haptic device onto the virtual environment.

The server 110 receives the information (in detail, the information of the displacement of the HIP) of the manipulation of the haptic device by the user. The server 110 detects the collision between the user on the haptic device (in detail, the HIP of the haptic device manipulated by the user) and a virtual object. According to the present invention, at least one virtual object exists on the virtual environment, and obstacles over the above-described virtual car racing game are examples of virtual objects. The virtual object may be 3-D data.

If the server 110 is connected to a plurality of clients 120, the server 110 collects changed HIP data from all of the clients 120 and then detects the collision between the HIPs of the clients 120 and the virtual objects.

If the server 110 detects the collision between the user (in detail, HIP) of the haptic device on the virtual environment and the virtual object, the server 110 calculates the physical force, which is applied to the user of the haptic device on the virtual environment from the virtual object through feedback, by using a spring-damper model of following Equation 1.

$$f_e(n) = -K(x_e(n)-x_0(n)) + B(\dot{x}_e(n)-\dot{x}_0(n))$$

$$x_e(n) = x_d(n-d_1) \qquad (1)$$

In Equation 1, fe(n) denotes the physical force applied to the user of the haptic device through the feedback, and $x_e$, $x_d$, $x_0$, K, B, and dl denote a position value of a delayed HIP, the position value of the HIP at the side of the client 120, the position value of the virtual object (subject to colliding), a spring coefficient, a damping coefficient, and a path delay value from the client 120 to the server 110 which are transferred to the server 110.

After the server 110 calculates the feedback physical force, the server 110 calculates the updated position of the virtual object through following Equation 2.

$$m_0 \ddot{x}_0(t) + b_0 \dot{x}_0(t) = \Sigma f_e(n) \qquad (2)$$

In Equation 2, $m_0$ and $b_0$ denote the mass and the friction of the virtual object, respectively, and the right item of Equation 2 represents the total sum of the physical force of at least one client connected to the server 110. As described above, the updated position value of the virtual object is transferred to all clients 120 connected to the server 110.

The client 120 includes an application node 130, a display cluster 164, and a tiled display module 166. In this case, the application node 130 includes a haptic rendering module (controller) 140, a graphic rendering module 150, and a tiled display controller 160. The graphic rendering module 150 includes a projecting module 152 and a pixel distribution module 154. The application node 130 may be realized by a computer (e.g., PC) of the user of the haptic device.

The application node 130 uses the virtual object received from the server 130 as it is, but does not calculate the present position of the virtual object.

The haptic rendering module 140 detects the collision between the user (in detail, HIP) of the haptic device on the virtual environment and each of at least one virtual object and calculates the physical force ($f_d$) corresponding to the detected result through following Equation 3. The physical force ($f_d$) represents the physical force applied to the haptic device. In detail, the physical force ($f_d$) refers to physical force applied to the haptic device in order to provide the physical force, which is felt by the user of the haptic device when the HIP collides with the virtual object, to the user of the haptic device, $$f_d(n) = K(x_d(n) - x_0(n - d_2)) + B(x_d(n) - x_0(n - d_2)) \quad (3)$$

In Equation 3, $x_d$ and $d_2$ denote the HIP position of the haptic device and the path delay value from the server 110 to client 120.

The graphic rendering module 150 performs a graphic rendering work to display virtual objects and the background of the virtual environment, which are represented as 3-D data, onto a 2-D display. According to the present invention, the display image refers to 2-D image data resulting from the graphic rendering work of the graphic rendering module 150. An object stream refers to result data after the graphic rendering work has been performed with respect to 3-D data representing the HIP of the haptic device on the virtual environment, or the virtual object which is represented as 3-D data. Background pixels refer to pixels corresponding to the background of the virtual environment on the display image.

The graphic rendering module 150 according to at least one embodiment of the present invention converts each of virtual objects represented as 3-D data into object streams represented as 2-D data so that each virtual object can be displayed in the 2-D. Then, the graphic rendering module 150 assigns a priority and a frame rate to each converted object stream according to a preset assignment criterion.

The graphic rendering module 150 includes a projecting module 152 and a pixel distribution module 154.

The projecting module 152 converts a 3-D image into a display image serving as a 2-D image including object streams by projecting a 3-D image including virtual objects onto a predetermined plane.

The pixel distribution module 154 assigns a portion of one display image to each of displays constituting the tiled display module 166 and provides a related portion of the image to each display so that the displays of the tiled display module 166 can integrally display the one image.

Schemes of assignment and distributing the display image to each display of the tiled display module 166 by the pixel distribution module 154 are determined by the tiled display controller 160. Accordingly, the operation of the pixel distribution module 154 is controlled by the pixel distribution module 154.

The tiled display controller 160 controls the display cluster 164 to minimize the time difference between time points at which the displays of the tiled display module 166 commence the display of the related portions of the display image.

The display cluster 164 receives the pixels of the display image from the pixel distribution module 154 through LAN 162, and displays one display image through the displays of the tiled display module 166 according to the distribution of the pixel distribution module 154.

The tiled display module 166 is realized as displays, and the displays display the related portions of the display image including object streams and background pixels of the virtual objects.

The tiled display module 166 receives each object stream from the graphic rendering module 150 according to the related priority and the related frame rate, and each display of the tiled display module 166 displays the related portion of the display image corresponding to each display.

Meanwhile, the user of the haptic device may change the display pattern of the displays of the tiled display module 166 according to the need of the user. The display pattern refers to a display scheme representing whether the display image is displayed while moving, displayed in a zoom-in state or a zoom-out state, or displayed through rotation. The changed display pattern may be reflected on the operation of the tiled display module 166 through the tiled display controller 160 and the display cluster 164.

Figure 2:
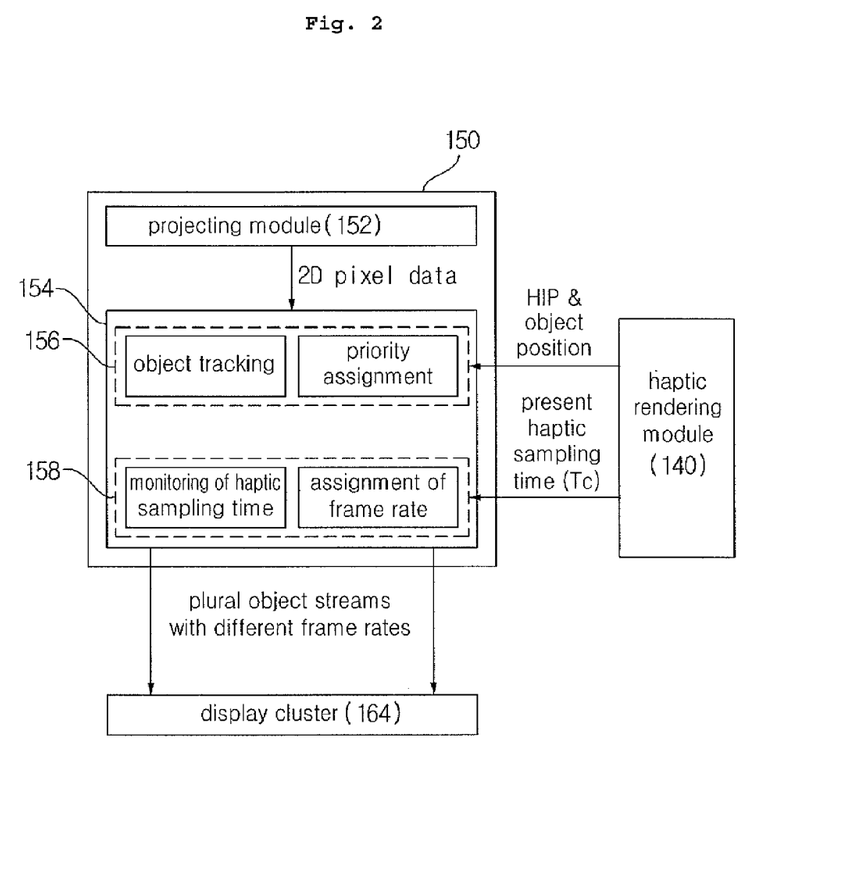
FIG. 2 is a view to explain the resource management scheme according to at least one embodiment of the present invention with reference to FIG. 1.
Figure 3:
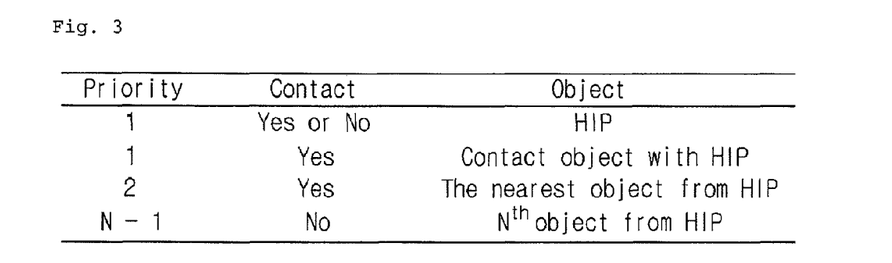
FIG. 3 is a view showing the assignment principle of a priority according to at least one embodiment of the present invention.
Figure 4:
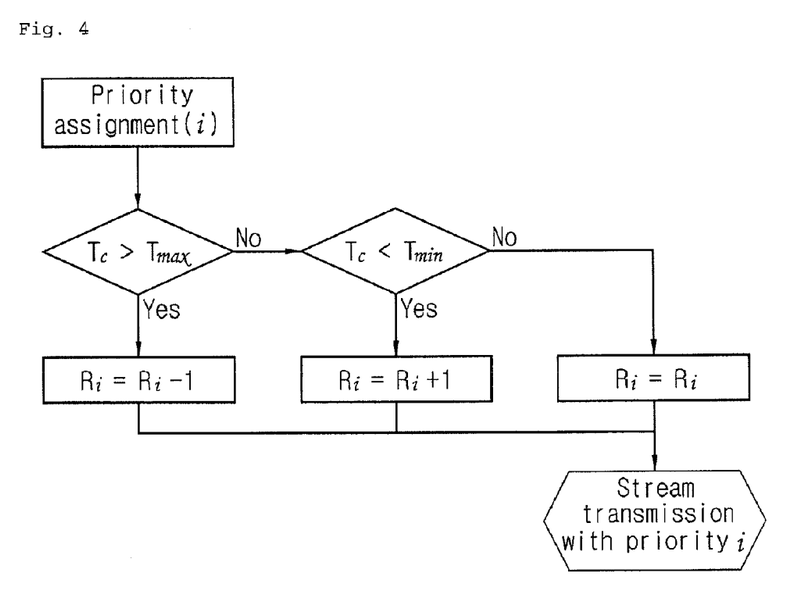
FIG. 4 is a flowchart showing the control principle of the frame rate according to at least one embodiment of the present invention.

FIG. 2 is a view to explain the resource management scheme according to at least one embodiment of the present invention with reference to FIG. 1. FIG. 3 is a view showing the assignment principle of a priority according to at least one embodiment of the present invention. FIG. 4 is a flowchart showing the control principle of the frame rate according to at least one embodiment of the present invention.

Since the hardware performance of an apparatus for implementing a haptic-based networked virtual environment is restricted as described above, there is a limitation in stably executing both of a haptic rendering process and a graphic rendering process. Accordingly, the present invention suggests a system for effectively implementing a haptic-based networked virtual environment system to support the high-resolution tiled display as shown in FIG. 1. In addition, the present invention suggests a scheme of effectively using the limited resources. Hereinafter, the system for effectively implementing the haptic-based networked virtual environment system and the scheme of effectively using the limited resources will be described.

The resource management scheme according to at least one embodiment of the present invention is named an object-based display scheme in the following description.

An application node 130 according to at least one embodiment of the present invention manages resources according to the object-based display scheme, so that a virtual environment allowing the user of the hatpic device to more visually and tactual immerse thereto can be effectively implemented by using the limited resources.

Figure 6:
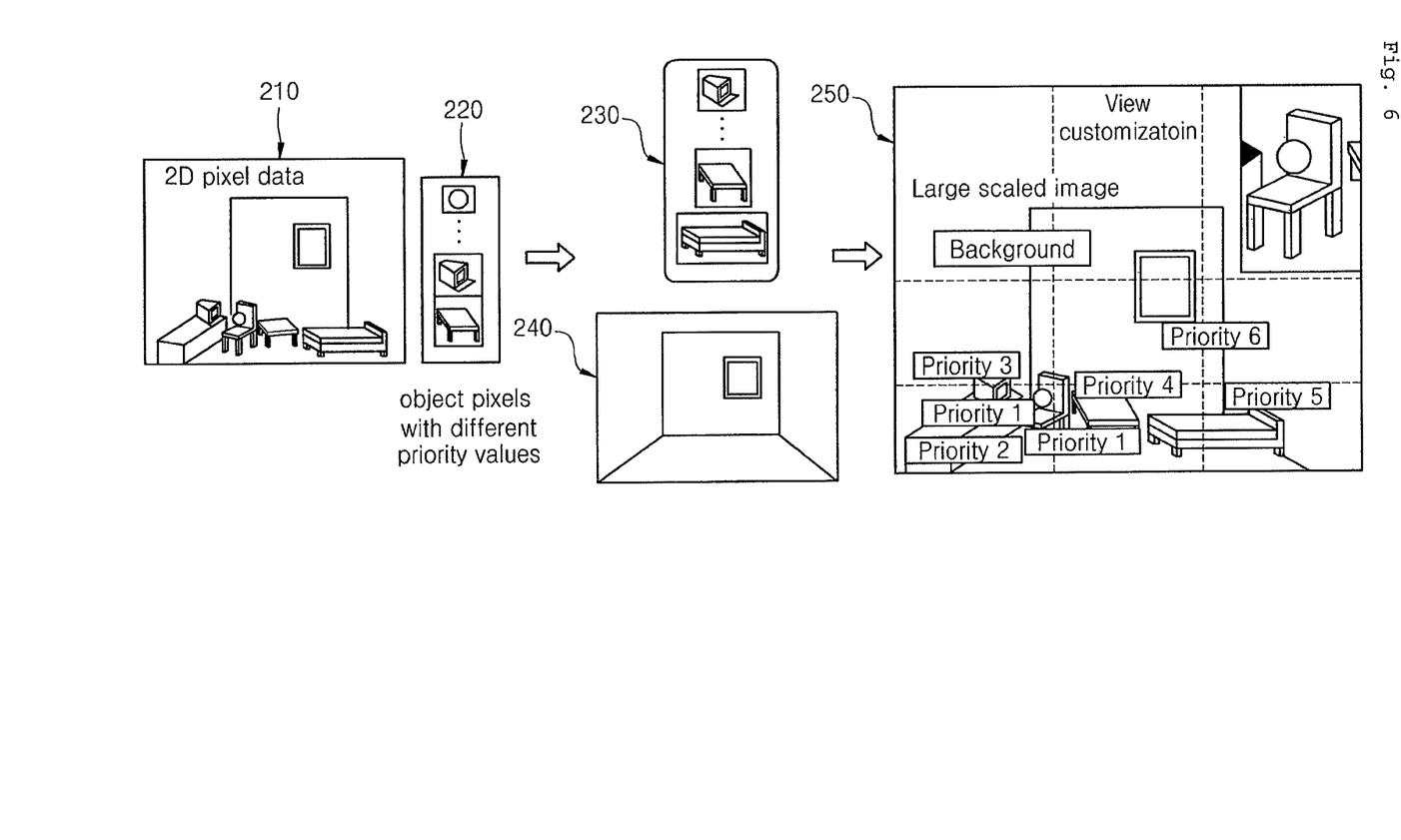
FIG. 6 is a view to explain the assignment principle of a priority shown in FIG. 3.

In detail, the application node 130 according to at least one embodiment of the present invention can perform the haptic rendering process of detecting the collision between the user of the haptic device over the virtual environment and each of at least one virtual object and providing the physical force corresponding to the detection result to the haptic device. Meanwhile, as shown in FIG. 6, the application node 130 can perform the graphic rendering process of converting each virtual object represented as 3-D data into an object stream represented as 2-D data to be displayed as a 2-D image as shown through reference numeral 210, and assigning a priority and a frame rate to each object stream 220 according to the preset assignment criterion. The display image 250 including object streams 230 of the virtual object and background streams 240 is displayed through a plurality of displays (the tiled display module 166), so that the virtual environment allowing the user of the haptic device to more visually and tactual concentrate thereto can be effectively implemented by using the limited resources. The object streams 230 are multiple object streams with different frame rates, and refer to object pixels with different priorities.

The pixel distribution module 154 includes an object-based scene segmentation module 156 and a frame rate control module 158.

The object-based scene segmentation module 156 tracks each object stream and assigns a priority corresponding to user preference information to the object stream. Referring to FIG. 3, the user of the haptic device is greatly interested in the display of the HIP of the haptic device (represented in FIG. 3 as "Priority 1, contact 'yes or no' (HIP collides with the virtual object or does not collide with the virtual object), and Object=HIP (i.e., the object stream corresponding to the priority 1 is the HIP of the haptic device)"). The user of the haptic device is next interested in the case in which the object stream of the virtual objet closer to the HIP is displayed prior to the object stream of the virtual object less close to the HIP or at least simultaneously with the object stream of the virtual object less close to the HIP (represented in FIG. 3 as "Priority 1, object=contact object with HIP", . . . , and "Priority (N−1), object=$N^{th}$ object from HIP").

The frame rate control module 158 monitors the haptic sampling time, and assigns a frame rate to each object stream by taking present haptic sampling time Tc into consideration.

In details the frame rate control module 158 compares the present haptic sampling time Tc with the maximum allowable sampling time Tmax or the minimum allowable sampling time Tmin and operates according to the comparison result.

In detail, the frame rate control module 158 can control the frame rate Ri used to display an object stream having the priority i, that is, the frame rate in which the object stream having the priority i is provided to the tiled display module 166. The details thereof will be described below. If the present haptic sampling time Tc exceeds the maximum allowable sampling time Tmax, the numerical value of the frame rate Ri is reduced by a predetermined numerical value (Ri−1), and if the present haptic sampling time Tc is less than the minimum allowable sampling time Tmin, the numerical value of the frame rate Ri is increased by a predetermined numerical value (Ri+1). If the present haptic sampling time Tc does not exceed the maximum allowable sampling time Tmax and is greater than the minimum allowable sampling time Tmin, the value of the frame rate Ri is used without the adjustment thereof (see FIG. 4). The maximum allowable sampling time Tmax or the minimum allowable sampling time Tmin is a preset value. In addition, if the present haptic sampling time Tc is greater than the maximum allowable sampling time Tmax, the haptic-based networked virtual environment becomes in the unstable state. In this case, through the frame rate adjusting scheme (object-based display scheme) the value of the frame rate Ri is reduced as described above in order to assign more many resources to the haptic rendering process. Similarly, if the present haptic sampling time Tc is less than the minimum allowable sampling time Tmin, the haptic-based networked virtual environment becomes in the stable state. In this case, since the graphic frame rate is excessively low to the extent that the user (of the haptic device) is interrupted when the user immerses into the virtual environment, the value of the frame rate Ri is increased as described above through the frame rate adjusting scheme (object-based display scheme) in order to assign more many resources to the graphic rendering process.

The display cluster 164 creates a display image by combining object streams and background pixels.

Figure 5:
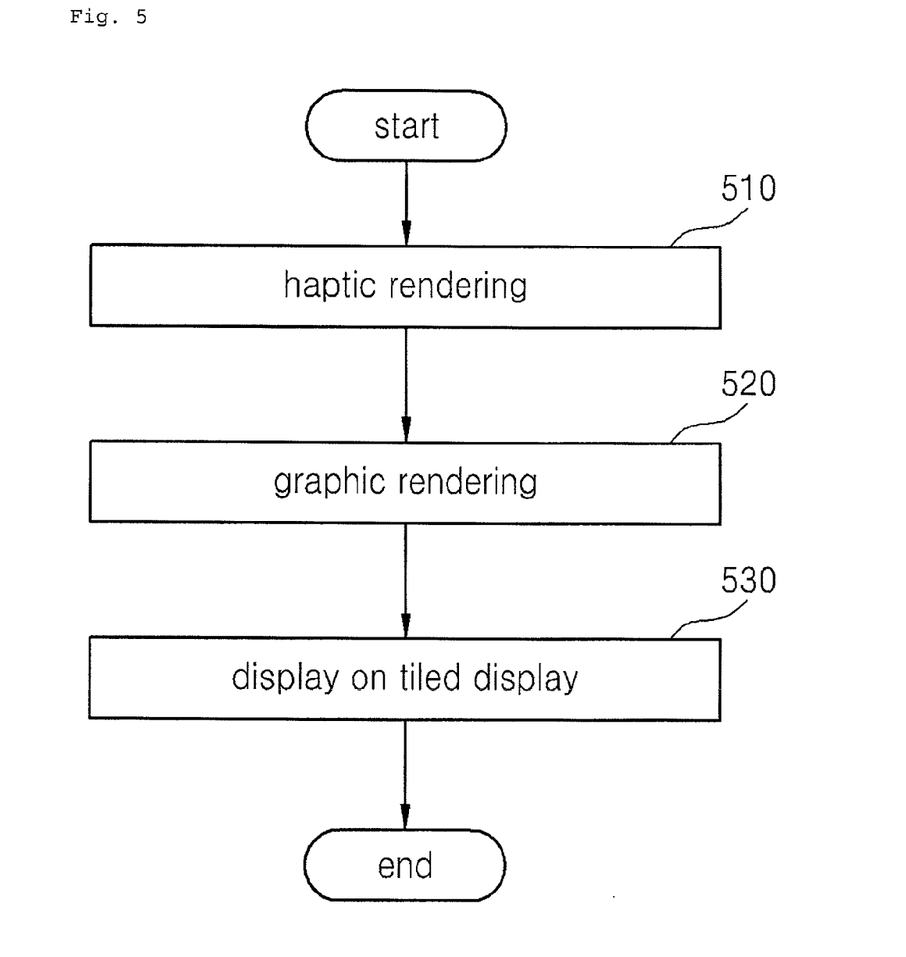
FIG. 5 is a flowchart corresponding to FIG. 1 and showing a method of implementing the haptic-based networked virtual environment according to at last one embodiment of the present invention.

FIG. 5 is a flowchart corresponding to FIG. 1, and a flowchart showing a method of implementing the haptic-based networked virtual environment according to at last one embodiment of the present invention.

The apparatus for implementing the haptic-based networked virtual environment according to at least one embodiment of the present invention detects the collision between the user of the haptic device on the virtual environment and at least one virtual object, and provides the physical force corresponding to the detection result to the haptic device (step S510).

After step S510, the apparatus for implementing the haptic-based networked virtual environment according to at least one embodiment of the present invention converts each of virtual objects represented as 3-D data into object streams represented as 2-D data to be displayed in the 2-D, and assigns a priority and a frame rate to each converted object stream according to a preset assignment criterion (step S520).

After step S520, each display of the apparatus for implementing the haptic-based networked virtual environment according to at least one embodiment of the present invention displays a related portion of the display image, which includes the object streams and background pixels of the virtual objects, corresponding to each display (step S530).

A program to execute the above method of implementing the haptic-based networked virtual environment supporting the high-resolution tiled display in a computer may be stored in a computer-readable recording medium.

In this case, the computer-readable recording medium includes a storage medium such as a magnetic storage medium (e.g., ROM, a floppy disc, or a hard disc), or an optical reading medium (e.g., CD-ROM or digital versatile disc (DVD)).

Although the exemplary embodiments of the present invention have been described, it is understood that the present invention should not be limited to these exemplary embodiments but various changes and modifications can be made by one ordinary skilled in the art within the spirit and scope of the present invention as hereinafter claimed.

INDUSTRIAL APPLICABILITY

The present invention is applicable to implementing a haptic-based networked virtual environment.

The invention claimed is:

1. An apparatus for implementing a haptic-based networked virtual environment supporting a high-resolution tiled display, the apparatus comprising:
    a haptic rendering module detecting collision between a user of a haptic device over a virtual environment and at least one virtual object and providing a physical force corresponding to a detection result to the haptic device;
    a graphic rendering module converting each virtual object represented as 3-D data into an object stream represented as 2-D data such that each virtual object is displayed as a 2-D image, and assigning a priority and a frame rate to each converted object stream according to a preset assignment criterion; and
    a tiled display module including a plurality of displays, and receiving each object stream according to the priority and the frame rate for the object stream, in which each display displays a portion of a display image, which includes the object streams of the virtual objects and background pixels, corresponding to each display.

2. The apparatus of claim 1, wherein the graphic rendering module includes:
    a projecting module converting a 3-D image including the virtual objects into the display image which is a 2-D image including the object streams; and
    a pixel distribution module assigning the portion of the display image to each display such that the displays integrally display the display image, and providing the portion of the display image corresponding to each display to the display.

3. The apparatus of claim 2, wherein the pixel distribution module includes:
an object-based segmentation module tracking each object stream and assigning the priority corresponding to user preference information to the object stream; and
a frame rate control module assigning the frame rate to the object stream by taking a present haptic sampling time into consideration.

4. The apparatus of claim 3, wherein the frame rate control module compares the present haptic sampling time with a maximum allowable sampling time or a minimum allowable sampling time and operates according to a comparison result.

5. The apparatus of claim 3, wherein the frame rate control module decreases a numerical value of the frame rate by a predetermined value if the present haptic sampling time exceeds a maximum allowable sampling time, and increases the numerical value of the frame rate by a predetermined numerical value if the present haptic sampling time is less than a minimum allowable sampling time.

6. The apparatus of claim 1, further comprising a display cluster creating the display image by combining the object streams with the background pixels.

7. The apparatus of claim 1, wherein at least one apparatus for implementing the haptic-based networked virtual environment supporting at least one high-resolution tiled display is connected to a server, and wherein position information of each virtual object is information provided from the server to each apparatus for implementing the haptic-based networked virtual environment supporting the high-resolution tiled display.

8. A method of implementing a haptic-based networked virtual environment supporting a high-resolution tiled display, the method comprising:
(a) detecting collision between a user of a haptic device over a virtual environment and each of at least one virtual object and providing a physical force corresponding to a detection result to the haptic device;
(b) converting each virtual object represented as 3-D data into an object stream represented as 2-D data such that each virtual object is displayed as an 2-D image, and assigning a priority and a frame rate to each converted object stream according to a preset assignment criterion; and
(c) receiving each object stream according to the priority and the frame rate corresponding to the object stream, each of a plurality of displays displaying a portion of a display image, which includes the object streams of the virtual objects and background pixels, corresponding to the display.

9. The method of claim 8, wherein step (b) includes:
(b1) converting a 3-D image including the virtual objects into the display image which is a 2-D image including the object streams; and
(b2) assigning a portion of the display image to each display such that the displays integrally display the display image, and providing the portion of the display image corresponding to each display to the display.

10. The method of claim 9, wherein step (b2) includes:
(b21) tracking each object stream and assigning the priority corresponding to user preference information to the object stream; and
(b22) assigning the frame rate to the object stream by taking a present haptic sampling time into consideration.

11. The method of 10, wherein step (b22) is operated according to a comparison result after comparing the present haptic sampling time with a maximum allowable sampling time or a minimum allowable sampling time.

12. A computer-readable recording medium storing a computer program for executing the method claimed in claim 11 in a computer.

13. The method of claim 10, wherein, in step (b22), a numerical value of the frame rate is decreased by a predetermined value if the present haptic sampling time exceeds a maximum allowable sampling time, and the numerical value of the frame rate is increased by a predetermined numerical value if the present haptic sampling time is less than a minimum allowable sampling time.

14. A computer-readable recording medium storing a computer program for executing the method claimed in claim 13 in a computer.

15. A computer-readable recording medium storing a computer program for executing the method claimed in claim 13 in a computer.

16. A computer-readable recording medium storing a computer program for executing the method claimed in claim 10 in a computer.

17. A computer-readable recording medium storing a computer program for executing the method claimed in claim 9 in a computer.

18. The method of claim 8, further comprising creating the display image by combining the object streams with the background pixels, wherein, in step (c), the created display image is displayed.

19. The method of claim 8, wherein position information of each virtual object is information provided from a server to an apparatus performing the method of implementing the haptic-based networked virtual environment supporting the high-resolution tiled display.

20. A computer-readable recording medium storing a computer program for executing the method claimed in claim 8 in a computer.

* * * * *